No. 799,118. PATENTED SEPT. 12, 1905.
W. S. WASHBURN.
CAR BRAKE.
APPLICATION FILED JAN. 16, 1905.
2 SHEETS—SHEET 2.
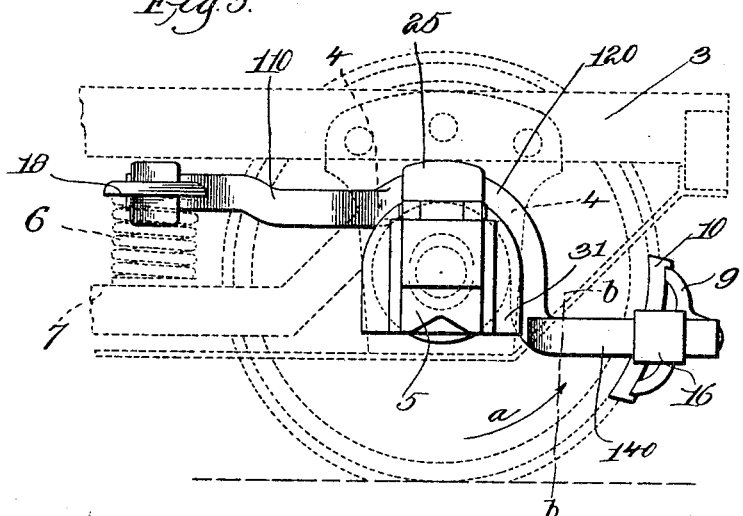
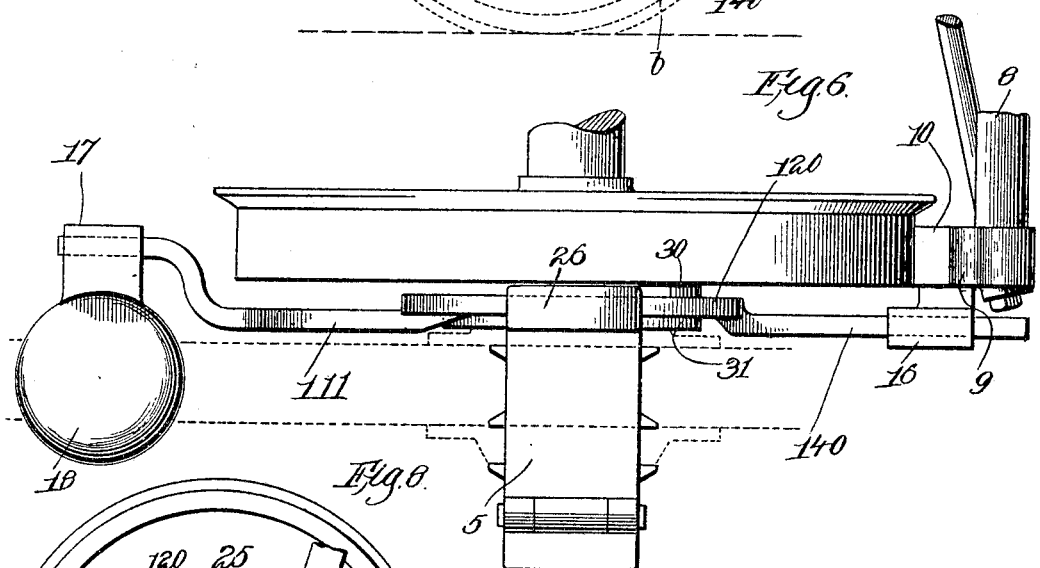
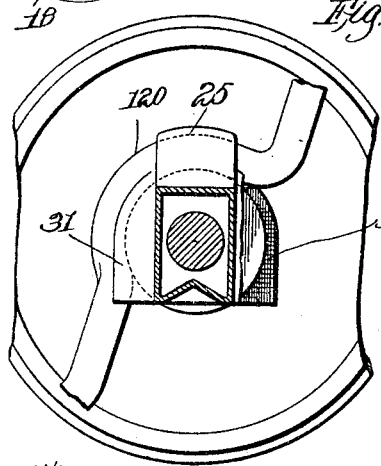
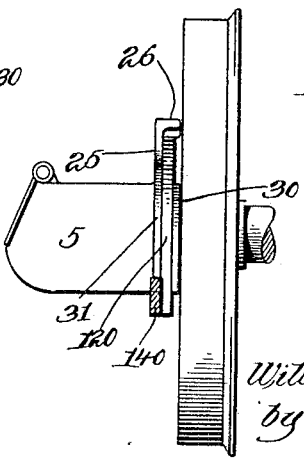
Witnesses.
H. C. Lunsford.
S. W. Lutton.
Inventor.
William S. Washburn,
by Crosby & Gregory
Atty's

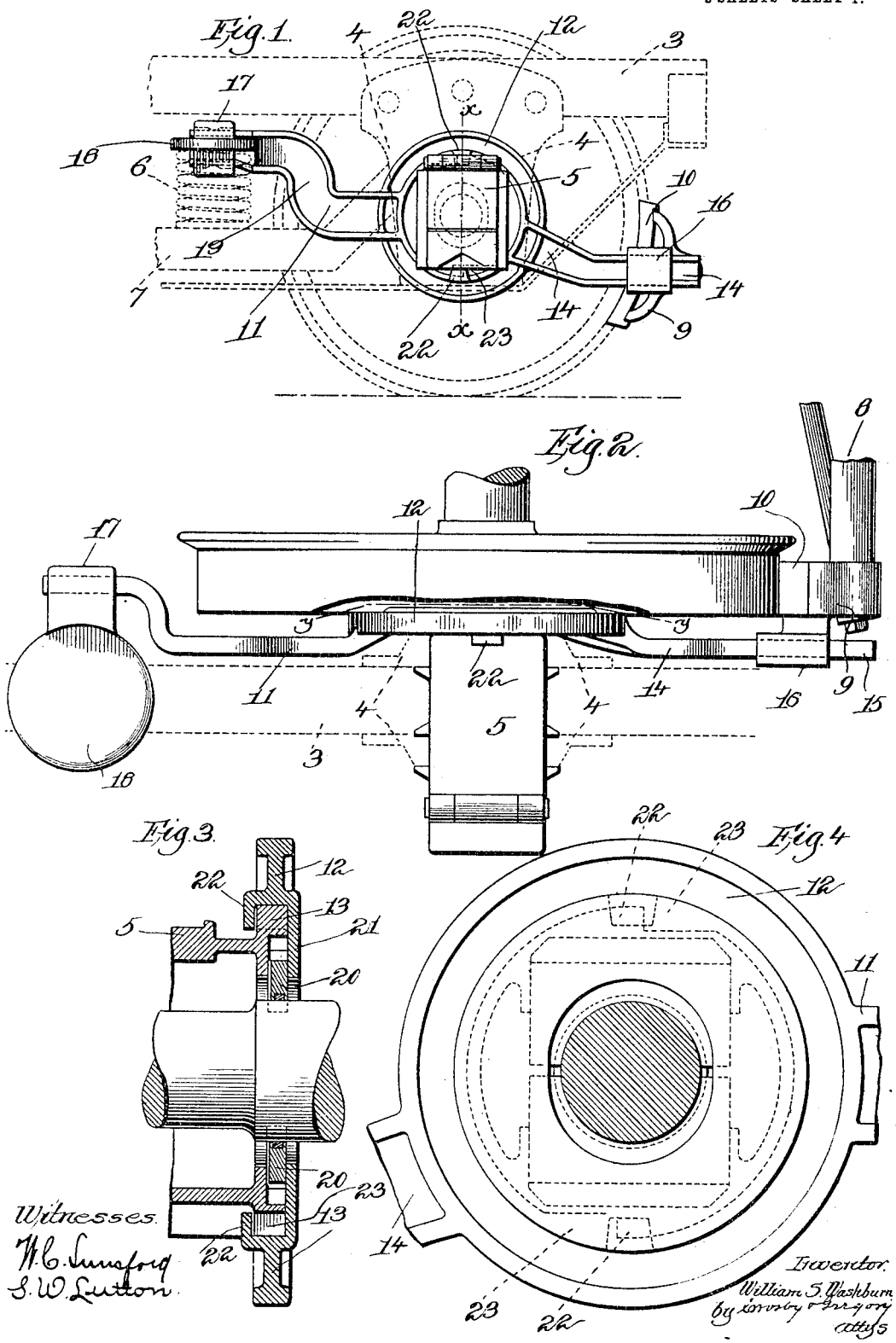

UNITED STATES PATENT OFFICE.

WILLIAM S. WASHBURN, OF BROCKTON, MASSACHUSETTS, ASSIGNOR TO LEVER SUSPENSION BRAKE COMPANY, OF BOSTON, MASSACHUSETTS, A CORPORATION OF MAINE.

CAR-BRAKE.

No. 799,118.        Specification of Letters Patent.        Patented Sept. 12, 1905.

Application filed January 16, 1905. Serial No. 241,248.

*To all whom it may concern:*

Be it known that I, WILLIAM S. WASHBURN, a citizen of the United States, residing at Brockton, county of Plymouth, and State of Massachusetts, have invented an Improvement in Car-Brakes, of which the following description, in connection with the accompanying drawings, is a specification, like numerals on the drawings representing like parts.

This invention relates to car-brakes of that class in which the brake is carried by a brake-supporting lever which is fulcrumed on a fulcrum member so supported that the frictional resistance between the brake-shoes and wheel when the brake is applied is transmitted directly to the car-axle instead of to the truck-frame. In Patent No. 758,177 is shown a car-brake of this class in which the axle-box is the fulcrum member and the brake-supporting lever rests on the top of said axle-box and is fulcrumed thereon. The device of my present invention differs from that illustrated in said patent in that the brake-supporting lever is provided with a bearing which encircles or partially encircles the car-axle and turns thereabout, the axis about which said lever turns coinciding or nearly coinciding with the axis of rotation of the car-axle.

In the accompanying drawings, which show some forms of my invention, Figure 1 is a side view of one end of a car-truck of ordinary construction, having one form of my improved brake suspension applied thereto, the car-truck being shown in dotted lines and my brake suspension in full lines. Fig. 2 is a top plan view of Fig. 1 drawn on an enlarged scale. Fig. 3 is a vertical section on the line $x$ $x$, Fig. 1. Fig. 4 is a section on the line $y$ $y$, Fig. 2. Fig. 5 is a side view of a car-truck having a different form of brake suspension. Fig. 6 is a top plan view of Fig. 5. Fig. 7 is a section on the line $b$ $b$, Fig. 5. Fig. 8 is a view showing how the brake-supporting lever shown in Fig. 5 may be removed.

In the car-truck illustrated in dotted lines 3 designates the wheel-piece; 4, the pedestal-jaws between which the axle-box 5 is received, 6 an equalizer-spring, and 7 an equalizer-bar. These parts are or may be of any suitable or usual construction.

The brake comprising the usual brake-beam 8, the brake-head 9, and the brake-shoe 10 is carried by a brake-supporting lever which is of special construction. This lever is fulcrumed so that its axis of motion coincides or nearly coincides with the axis of rotation of the car-axle.

In the form of the invention shown in Fig. 1 the brake-supporting lever has intermediate its ends an annular bearing portion 12, which encircles a circular flange 13, formed at the inner end of the axle-box 5 and within which flange the oil-box for receiving the usual dust-guard 20 is located. Said flange forms a bearing on which the ring or annular portion 12 turns. The brake is supported from the end 14 of said lever, and the end 11 thereof is connected in some suitable way with the truck-frame, preferably by passing through an eye 17 on the cap 18 of the equalizer-spring. In the form of the invention shown the outer end 14 of the brake-supporting lever stands substantially horizontally and is in substantially the same horizontal plane as that in which power is applied to the brake-beam for setting the brakes. The brake is mounted on this outer end 14 of the brake-supporting lever in some suitable way, preferably so that it can slide back and forth on said lever as the brakes are applied or released. For this purpose I have shown one of the parts comprising the brake as having an eye 16, through which the end 14 of the lever passes, said eye being slidably mounted on the lever, so as to permit the brake to move back and forth thereon as it is applied or released.

The inner end 11 of the lever is herein shown as having the vertical offset portion 19, so as to bring the portion of the lever adjacent the ring-like bearing portion 12 substantially in the horizontal plane of the car-axle.

The ring-like bearing portion 12 encircles the flange 13 and is provided with a side flange or portion 21, which overlies the inner face of the bearing-flange 13 and also overlaps the dust-guard 20, and thus forms one wall of the dust-guard chamber and serves to hold said dust-guard in place.

In order to hold the brake-supporting lever in proper position on the bearing-flange 13 and to prevent any lateral tipping thereof, I have shown said ring-like bearing portion 12 as provided with one or more guards in the nature of fingers or projections 22, which overlie the outer face of the flange 13, as best seen in Fig. 3, and which hold the flange 21 against the inner or end face of the flange 13.

To permit the brake-supporting lever to be applied to or removed from the axle-box, I have provided the flange 13 with one or more recesses or notches 23 in its periphery, depending on the number of guards 22 employed. These recesses are of such size and are so placed that the brake-supporting lever may be removed from the axle-box by simply turning said lever clockwise, Fig. 4, (or in the opposite direction, Fig. 1,) until the guards 22 stand opposite the recesses and then carrying the entire lever laterally. When the brake-supporting lever is in place on the axle-box, however, the guards are out of line with the notches, and therefore they serve to hold said lever in place.

In Fig. 5 I have illustrated a slightly-different form of the invention. In this embodiment the brake-supporting lever also turns about an axis substantially coinciding with the axis of the car-axle; but the portion of the lever which bears on the axle-box does not entirely inclose said axle-box. Instead said lever has intermediate its ends a bearing portion 120, which partially encircles the flange 13 on the inner end of the axle-box 5 and from which project the two arms 140 and 110, constituting the ends of the lever. The end 140 is that on which the brake is supported, and the end 110 is that which is secured to the truck-frame, preferably to the cap 18 of the equalizer-spring. The end 140 extends substantially horizontally and stands in the horizontal plane in which the power is applied to the brake, said end being shown as passing through a loop or eye 16, carried by the brake-shoe or some other appropriate part of the brake.

Whenever the brake is applied, the friction between the brake-shoe and the car-wheel will produce either an upward or a downward thrust on the end of the brake-supporting lever, depending on the direction in which the car is going. Where the brake-supporting lever is made as shown in Fig. 1, both the lifting and depressing force are taken directly by the axle-box, because the ring-like bearing portion 12 completely encircles the axle-box. In the embodiment of the invention shown in Figs. 5, 6, and 7, however, it is necessary to provide some special means to act as a fulcrum for the lever when the friction between the brake-shoe and car-wheel applies a lifting force to said lever. Accordingly I secure to the axle-box or form integral therewith a fulcrum-bracket 25, provided with the overhanging lip 26, against the under side of which the brake-supporting lever fulcrums when the brake is applied, with the wheel moving in the direction of the arrow $a$, Fig. 5.

In order to keep the brake-supporting lever in its proper vertical position, I have shown the axle-box as provided with two lateral guard-flanges 30 and 31, between which the portion 120 of said lever is confined. These guard-flanges prevent lateral movement of the lever and also prevent its being tipped out of its proper vertical position. The flange 30 is so shaped that by turning the lever into the position shown in Fig. 8 the portion 120 of said lever is carried out of engagement with said flange, thereby permitting the lever to be carried laterally and removed from the axle-box.

While I prefer to connect the brakes directly to the brake-supporting levers and to make this connection a slidable one, yet this is not essential to the present invention, the main feature of which is making the fulcrum-lever of such construction that it turns about an axis substantially coinciding with the axis of rotation of the car-axle. I find it most convenient to use the axle-box as the fulcrum member for the brake-supporting lever; but my invention would not be departed from if some other element were employed for this purpose, provided the fulcrum member was so arranged as to transmit the strain to which the lever is subjected to the car-axle.

I have shown in the drawings only one end of a car-axle and the axle-box at said end. It will be understood, however, that a brake-supporting lever, such as herein claimed, is to be fulcrumed on each axle-box, so that each end of each brake-beam is supported by a brake-supporting lever. It is not essential to the invention that the two levers at opposite ends of any axle be independent from each other.

It will be understood that various changes may be made in the construction and arrangement of the parts without departing from the invention.

Having fully described my invention, what I claim as new, and desire to secure by Letters Patent, is—

1. In a car-brake, a brake-supporting lever adapted to be fulcrumed on an axle-box to turn about an axis substantially coinciding with the axis of rotation of the car-axle, and a brake supported by said lever.

2. In a car-brake, a fulcrum member, a brake-supporting lever fulcrumed thereon to turn about an axis substantially coinciding with the axis of rotation of the car-axle, and a brake supported by said brake-supporting lever.

3. In a device of the class described, an axle-box having an annular bearing-flange and a brake-supporting lever engaging said flange and adapted to turn about an axis substantially coinciding with the axis of rotation of the car-axle, and a brake supported by said lever.

4. In a device of the class described, an axle-box having an annular flange, a brake-supporting lever having a bearing portion to engage said flange, an arm projecting from said bearing portion, and a brake secured directly to said arm.

5. In a device of the class described, an axle-box, a brake-supporting lever fulcrumed thereon to turn about an axis substantially coinciding with the axis of rotation of the car-axle, and means to prevent the lever from lateral movement and hold it in its vertical position.

6. A brake-supporting lever for a car-brake, said lever having intermediate of its ends a portion provided with an annular bearing which is adapted to engage and turn about a complemental bearing on the axle-box of a car.

7. A brake-supporting lever having intermediate of its ends a bearing to rest on a car-axle box, the portions of the lever which come opposite the rim of the wheel when the lever is in place being offset laterally.

8. A brake-supporting lever having intermediate of its ends a portion to engage and fulcrum on the axle-box of a car, the opposite ends of said lever being in substantially parallel separated planes.

9. A car-axle box having an open-ended dust-guard chamber, a brake-supporting lever fulcrumed on the axle-box and provided with a flange which closes the open end of said chamber, and a brake supported by the lever.

10. A brake-supporting lever having intermediate its ends a bearing portion to embrace an axle-box, the bearing portion of said lever having an inwardly-directed flange to overlie the dust-guard chamber of said axle-box.

11. An axle-box for a car provided with a flange constituting a bearing-surface for a brake-supporting lever, said bearing-surface being substantially concentric with the axis of rotation of the car-axle.

In testimony whereof I have signed my name to this specification in the presence of two subscribing witnesses.

WILLIAM S. WASHBURN.

Witnesses:
LOUIS C. SMITH,
BERTHA F. HEUSER.